(12) United States Patent
Fujinuma et al.

(10) Patent No.: US 7,654,250 B2
(45) Date of Patent: Feb. 2, 2010

(54) GAS FUEL SUPPLY APPARATUS

(75) Inventors: Masanori Fujinuma, Saitama (JP);
Eiichi Utsugi, Saitama (JP); Hiroaki Kojima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 12/088,588

(22) PCT Filed: Sep. 14, 2006

(86) PCT No.: PCT/JP2006/318258

§ 371 (c)(1),
(2), (4) Date: Mar. 28, 2008

(87) PCT Pub. No.: WO2007/037129

PCT Pub. Date: Apr. 5, 2007

(65) Prior Publication Data

US 2009/0229579 A1    Sep. 17, 2009

(30) Foreign Application Priority Data

Sep. 28, 2005   (JP) .............................. 2005-282110

(51) Int. Cl.
*F02M 37/00* (2006.01)
(52) U.S. Cl. .................... 123/512; 123/198 D; 123/529
(58) Field of Classification Search ................. 123/510, 123/511, 512, 527, 528, 529, 198 D, 198 DB, 123/179.16

See application file for complete search history.

(56) References Cited

U.S. PATENT DOCUMENTS 4,250,360 A * 2/1981 Svensson .................. 200/82 C (Continued)

FOREIGN PATENT DOCUMENTS

JP          6-299906 A     10/1994

(Continued)

OTHER PUBLICATIONS

International Search Report of PCT/JP2006/318258, date of mailing Dec. 19, 2006.

(Continued)

*Primary Examiner*—Stephen K Cronin
*Assistant Examiner*—Anthony L Bacon
(74) *Attorney, Agent, or Firm*—Westerman, Hattori, Daniels & Adrian, LLP

(57) ABSTRACT

An engine-start is inhibited when a gas engine is tilted, and the engine is immediately stopped. A shutoff valve (21) is provided on a liquefied fuel passage (15) supplying a liquefied fuel to a vaporizing chamber (14) from a cylinder (16). The shutoff valve (21) is provided with a diaphragm (28) to which a pulsation pressure of a crank chamber (4) is applied, and opens the liquefied fuel passage (15) if a negative pressure is applied to the diaphragm (28). A tilting shutoff valve (39) is provided in a pressure passage (34) transmitting the pulsation pressure to the shutoff valve (21). The tilting shutoff valve (39) which has a ball valve releases the pulsation pressure of the crank chamber (4) to an atmospheric air. If the pulsation pressure is open to the atmospheric air, the diaphragm (28) can not operate. Accordingly, the liquefied fuel passage 15 is kept being shut off, and is rapidly shut off in response to the tilt during the operation.

3 Claims, 2 Drawing Sheets

U.S. PATENT DOCUMENTS

| | | | | |
|---|---|---|---|---|
| 4,574,763 A | * | 3/1986 | Hallberg | 123/527 |
| 5,027,758 A | | 7/1991 | Siegler | |
| 5,904,130 A | * | 5/1999 | Romanelli | 123/527 |
| 6,467,466 B1 | * | 10/2002 | Maekawa et al. | 123/529 |
| 7,073,525 B2 | | 7/2006 | Chung | |
| 7,591,251 B1 | * | 9/2009 | Roche et al. | 123/516 |
| 2004/0244778 A1 | * | 12/2004 | Tanaka et al. | 123/479 |
| 2005/0061365 A1 | | 3/2005 | Chung | |

FOREIGN PATENT DOCUMENTS

| | | |
|---|---|---|
| JP | 2002-70652 A | 3/2002 |
| JP | 2005-98277 A | 4/2005 |

OTHER PUBLICATIONS

Notification of Transmittal of Translation of the International Preliminary Report on Patentability (Form PCT/IB/338) of International Application No. PCT/JP2006/318258 mailed May 22, 2008 with Forms PCT/IPEA/409.

* cited by examiner

GAS FUEL SUPPLY APPARATUS

TECHNICAL FIELD

The present invention relates to a gas fuel supply apparatus, and more particularly to a gas fuel supply apparatus in which a liquefied gas which is supplied via a liquefied gas supply path is vaporized within a pressure regulator and is supplied to a gas engine in a pressure regulated state.

BACKGROUND ART

Conventionally, a liquefied petroleum gas such as a butane gas or the like is used as a fuel of a spark ignition type engine. At a time of injecting the fuel to an intake pipe line so as to supply to the engine, it is general to inject the fuel by regulating and vaporizing at a predetermined positive pressure in place of a liquid state. However, there is a case that a liquid fuel makes an intrusion into a regulator in a stop state of the engine and the fuel is injected to the intake pipe line in a state including the liquid fuel at a time of starting the engine. In the case mentioned above, an air-fuel mixture becomes too rich so as to generate a start fault and an operation malfunction of the engine.

Accordingly, there has been proposed a liquefied gas supply apparatus structured such that a shutoff valve shutting off a supply path at a time when the engine stops is provided on the liquefied gas supply path, and the liquefied gas is supplied only during the engine operation by opening the shutoff valve at a time of starting the engine (Japanese Patent Application Laid-Open No. 2002-70652). [Patent Document 1] Japanese Patent Application Laid-Open No. 2002-70652

DISCLOSURE OF THE INVENTION

Problems to be Solved by the Invention

In the liquefied gas supply apparatus as described in the patent document 1 mentioned above, since an electromagnetic valve is frequently used as the shutoff valve, it is necessary to always have a battery ready for being applied to a gas engine. Further, even if the battery is provided, the shutoff valve can not be opened and closed in the case that the battery comes short of being charged. Accordingly, there is a problem to be solved that it is necessary to always pay attention to a charged state of the battery.

An object of the present invention is to provide a gas fuel supply apparatus which can solve the problem mentioned above, and can supply a fuel only during an operation, in the gas fuel supply apparatus supplying a liquefied gas supplied via a liquefied gas supply path to a gas engine in a state of vaporizing the liquefied gas within a pressure regulator so as to regulate a pressure thereof.

Means for Solving the Problems

In order to achieve the object mentioned above, in accordance with a first feature of the present invention, there is provided a gas fuel supply apparatus including a carburetor vaporizing a liquefied gas fuel supplied via a liquefied gas supply path; a pressure regulator regulating a pressure of the vaporized gas fuel; and the gas fuel supply apparatus supplying the pressure regulated gas fuel to a mixer provided in an engine, wherein the gas fuel supply apparatus includes a shutoff valve shutting off the liquefied gas supply path during a stop of the engine, and canceling the shutoff in response only to a pressure change within the engine going with a rotation of the engine; a pressure passage for transmitting the pressure change within the engine to the shutoff valve; and a tilting shutoff valve provided in the pressure passage.

Further, in accordance with a second feature of the present invention, the pressure change is constituted by a pulsation generated within a crank chamber of the engine on the basis of a reciprocating motion of a piston.

Further, in accordance with a third feature of the present invention, the tilting shutoff valve has a pressure releasing means communicating the pressure passage with an atmospheric air in response to a tilt equal to or more than a predetermined angle of the engine.

Further, in accordance with a fourth feature of the present invention, the tilting shutoff valve is provided with a casing, a first opening communicating with the pressure passage and a second opening communicated with an atmospheric air are formed in the casing, and a spherical valve body energized to the first opening in a gravitational direction by a spring is provided within the casing so as to construct the pressure releasing means.

EFFECT OF THE INVENTION

In accordance with the first feature, since an opening and closing motion of the shutoff valve is carried out by utilizing the negative pressure going with the rotation of the engine, it is possible to securely shut off the liquefied gas supply path at a time when the engine stops, and it is possible to start supplying the fuel at a suitable timing on the basis of the pressure change generated together with the rotation start, at a time when the engine is rotated for starting.

Further, in accordance with the first feature, since the tilting shutoff valve is provided on the pressure passage, the pressure for the operation is not transmitted to the shutoff valve on the liquefied gas supply path even if the engine is under rotation at a time when a tilting state of the engine is detected, whereby the liquefied gas supply path is shut off and the engine is stopped.

In accordance with the second feature, since the shutoff valve is opened by utilizing the pulsation pressure within the crank chamber of the engine, the opening timing of the shutoff valve is suitable, and the operation is secure.

In accordance with the third feature, since the structure is made by a mechanical operation communicating the pressure passage transmitting the pressure change of the engine with the atmospheric air, the operation is rapid and secure.

In accordance with the fourth feature, since the structure is made by a simple construction in which the gravitational direction against the first opening is changed at a time of tilting and the spherical valve body is disconnected from the first opening, and the first opening is communicated with the second opening via the internal space, a reliability of the operation is high.

DESCRIPTION OF THE REFERENCE NUMERALS

E . . . engine, 1 . . . crank shaft, 2 . . . recoil starter, 3 . . . power generator, 7 . . . mixer, 10 . . . fuel nozzle, 12 . . .

vaporized fuel passage, 13 ... pressure regulator, 14 ... vaporizing chamber, 15 ... liquefied fuel passage, 16 ... fuel cylinder, 21 ... first shutoff valve, 34 ... pressure passage, 39 ... tilting shutoff valve, 40. .. opening (first opening), 41 ... casing, 42 ... depressurizing hole (second opening), 44 ... spherical valve body

BEST MODE FOR CARRYING OUT THE INVENTION

Figure 1:
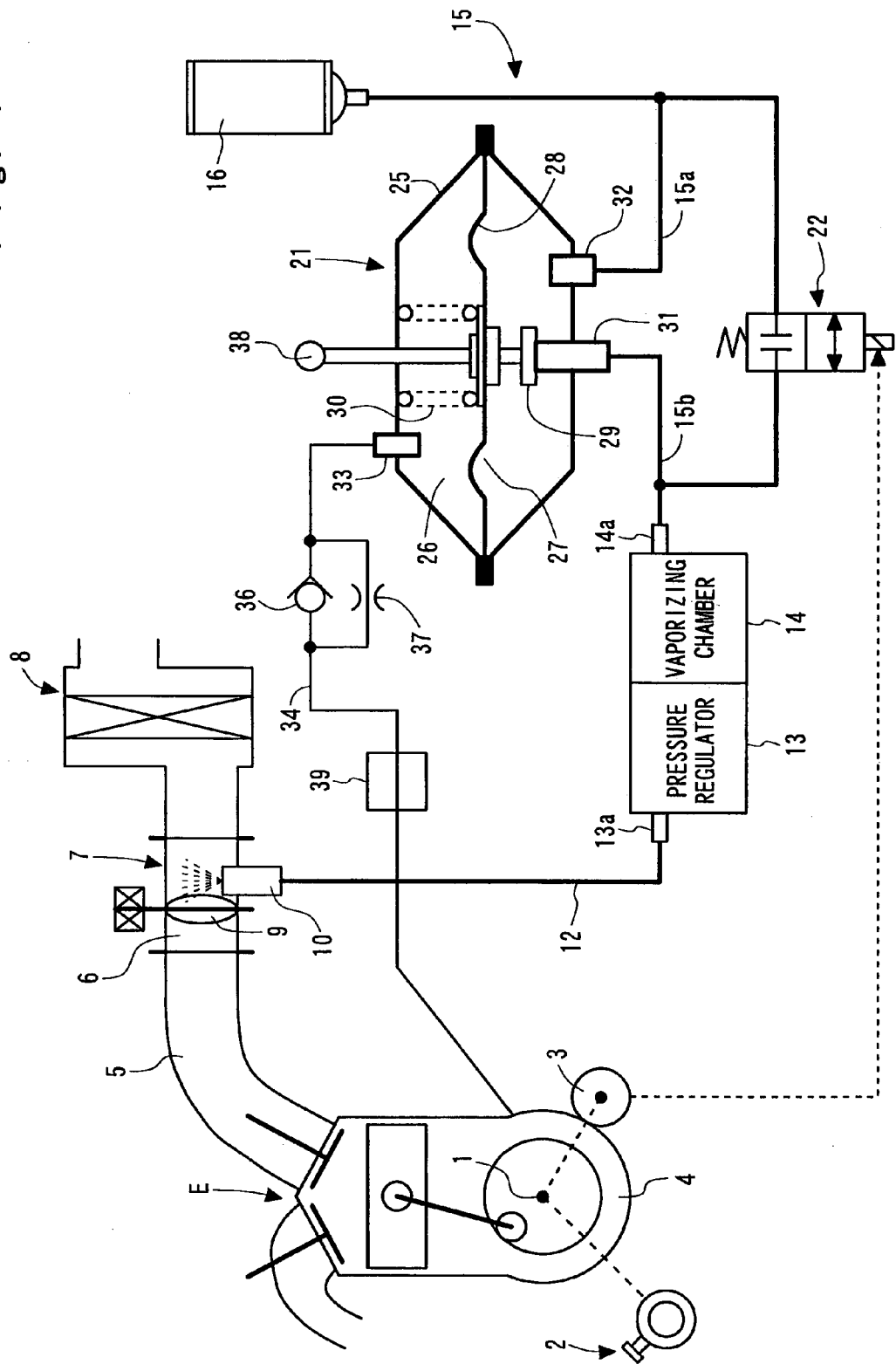
FIG. 1 is a system diagram of a fuel supply apparatus in accordance with an embodiment of the present invention.

A description will be in detail given below of an embodiment in accordance with the present invention with reference to the accompanying drawings. FIG. 1 is a fuel supply system diagram of a fuel supply apparatus provided within a gas engine in accordance with an embodiment of the present invention. A recoil starter 2 is connected to a crank shaft 1 of a gas engine E for operating a start at a time of starting the engine, and a power generator 3 driven by the engine E is provided. A mixer 7 is installed to an intake passage 6 communicating with an intake port 5 of the engine E, and an air cleaner 8 for cleaning an intake air passing through the intake passage 6 is connected to the mixer 7.

The mixer 7 is provided with a throttle valve 9 for opening and closing the intake passage 6, and a fuel nozzle 10 directed to the intake passage in an upstream side of the throttle valve 9, and an upstream end of a vaporized fuel passage 12 connected to the fuel nozzle 10 is connected to a fuel outlet 13a of a pressure regulator 13. A vaporizing chamber 14 disposed at an upper stream side of the pressure regulator 13, and a downstream end of a liquefied fuel passage 15 extended from a cassette type fuel cylinder 16 filled with a liquefied gas fuel (for example, a liquefied butane gas) is connected to a fuel inlet 14a of the vaporizing chamber 14. The pressure regulator 13 is structured such as to regulate a high-pressure vaporized fuel vaporized by the vaporizing chamber 14 to an atmospheric pressure.

A first shutoff valve 21 and a second shutoff valve 22 are interposed in the liquefied fuel passage 15 in a parallel state to each other. The first shutoff valve 21 is provided with a housing 25, a diaphragm 28 comparting an inner side of the housing 25 so as to form a negative pressure actuation chamber 26 and a valve chamber 27, a valve body 29 coupled to a center portion of the diaphragm 28 in the valve chamber 27, and valve closing spring 30 accommodated in the negative pressure actuation chamber 26 so as to energize the diaphragm 28 to the valve chamber 27 side.

The housing 25 is provided with a valve seat pipe 31 on which the valve body 29 seats, a fuel introduction pipe 32 which is always open to the valve chamber 27, and a negative pressure introduction pipe 33 which is always open to the negative pressure actuation chamber 26. A downstream end of the upstream side portion 15a of the liquefied fuel passage 15 extended from the fuel cylinder 16 is connected to the fuel introduction pipe 32, and an upstream side of the downstream side portion 15b of the liquefied fuel passage 15 extending to the vaporizing chamber 14 is connected to the valve seat pipe 31.

A pressure passage 34 extended from the crank chamber 4 of the gas engine E is connected to the negative pressure introduction pipe 33. A one-way valve 36 transmitting only the negative pressure in a pulsation pressure of the crank chamber 4 to the negative pressure actuation chamber 26 side, and a leak orifice 37 are interposed in a parallel manner to the pressure passage 34.

Further, a manual rod 38 slidably and hermetically passing through a ceiling wall of the housing 25 is coupled to the diaphragm 28 and the valve body 29, and it is possible to forcibly make the valve body 29 break away from the valve seat pipe 31 by pulling the manual rod 38. The second shutoff valve 22 is of an electromagnetic type, and is set to be excited by a generation power of the power generator 3 so as to open the valve. Further, a tilting shutoff valve 39 is provided on the pressure passage 34.

Figure 2:
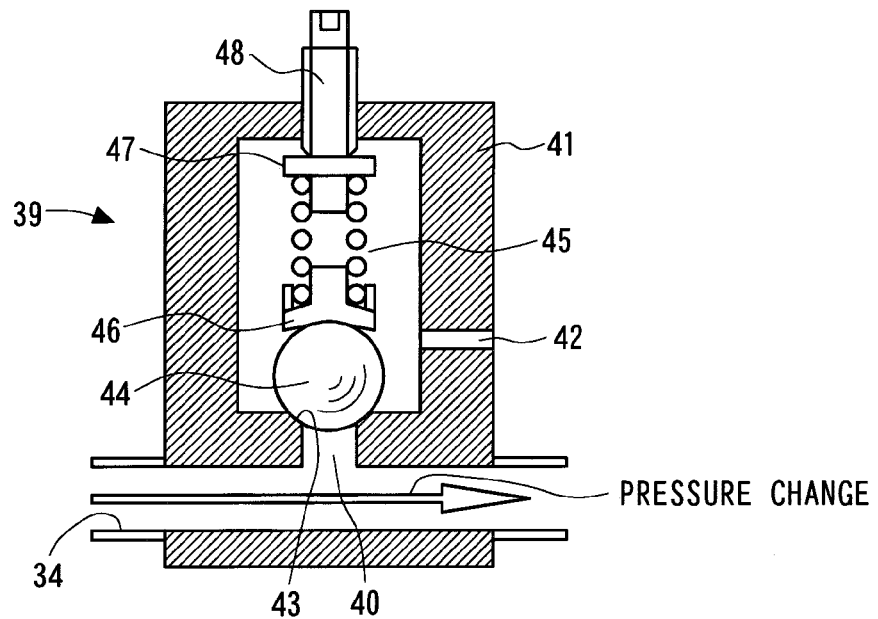
FIG. 2 is a cross sectional view of a tilting shutoff valve in a vertical state.

FIG. 2 is a cross sectional view of the tilting shutoff valve 39. The tilting shutoff valve 39 is provided with a casing 41 having a first opening 40 communicating with a horizontal portion of the pressure passage 34. A depressurizing hole 42 serving as a second opening is formed in a side wall of the casing 41. The first opening 40 has a valve seat 43 in an inner side of the casing 41, and a spherical valve body 44 adapts to the valve seat 43. There is provided a coil spring 45 for pushing the spherical valve body 44 to the valve seat 43. The coil spring 45 is installed between a spring seat 46 in the spherical valve body 44 side, and a spring seat 47 arranged in the casing 41 side. The spring seat 47 is formed in one end of a bolt 48 screw inserted to the casing 41. The coil spring 45 is designed and regulated in connection to a weight and a magnitude of the spherical valve body 44, a dimension of the valve seat 43 or the like, in such a manner that the spherical valve body 44 can break away from the valve seat 43 at a time when the casing 41 is tilted at a predetermined angle (for example, 45 degree).

A description will be given of an operation of the fuel supply apparatus having the structure mentioned above. At a time of starting the gas engine E, a cranking is generated by operating the recoil starter 2. If the piston is reciprocated in accordance with this cranking, a pulsation pressure is generated in the crank chamber 4. In the pulsation pressure, only the negative pressure is transmitted to the negative pressure actuation chamber 26 of the first shutoff valve 21 via the one-way valve 36. The negative pressure of the negative pressure actuation chamber 26 biases the diaphragm 28 to the negative pressure actuation chamber 26 side against the pressure force of the return spring 30. Accordingly, the high-pressure liquefied fuel of the fuel cylinder 16 flows into the vaporizing chamber 14 via the liquefied fuel passage 15, the fuel introduction pipe 32 of the first shutoff valve 21, the valve chamber 27 and the valve seat pipe 31.

The fuel vaporized by the vaporizing chamber 14 is supplied into the mixer 7 from the fuel nozzle 10 via the vaporized fuel passage 12 after being regulated to the atmospheric pressure by the pressure regulator 13. In the intake passage 6 within the mixer 7, an air-fuel mixture of an atomized fuel from the fuel nozzle 10 and an air cleaned by the air cleaner 8 is generated. The air-fuel mixture is supplied to the gas engine E while being controlled a flow rate by the throttle valve 9, and the engine E is started.

Since the first shutoff valve 21 is structured such as to be opened by utilizing the pulsation pressure generated in the crank chamber 4 as mentioned above, it is possible to securely open the valve working with the cranking by the manual operation. Accordingly, even in the gas engine which does not always have the battery ready, and even in the gas engine which always has the battery ready, however, comes short of being charged, it is possible to securely feed the vaporized fuel to the mixer 7 so as to smoothly start.

If the gas engine E comes to a normal operating state, and the power generator 3 starts generating power, a part of the output thereof is fed to the electromagnetic type second shutoff valve 22, and the second shutoff valve 22 is excited so as to be opened. An opening degree of the liquefied fuel passage 15 is expanded on the valve of the valve opening of the first and second shutoff valves 21 and 22, and it is possible to supply a sufficient amount of vaporized fuel to the mixer 7 even in a high-load operating state of the gas engine E. Further, the second shutoff valve 22 can be downsized by being used together with the first shutoff valve 21.

If the operation of the gas engine E is stopped, the crank chamber 4 comes to the atmospheric pressure state, and the atmospheric air in the crank chamber 4 flows into the negative pressure actuation chamber 26 of the first shutoff valve 21 through the leak orifice 37 arranged in parallel to the one-way valve 36. As a result, since the pressure of the negative pressure actuation chamber balances with the atmospheric pressure, the valve body 29 is seated on the valve seat pipe 31 on the basis of the pressure force of the valve closing spring 30. On the other hand, since the power generator 3 stops generating power, the second shutoff valve 22 is also closed.

Since the liquefied fuel passage 15 is shut off on the basis of the valve closing of the first and second shutoff valves 21 and 22, it is possible to prevent the liquefied fuel from being supplied to the vaporizing chamber 14 and the pressure regulator 13 from the fuel cylinder 16. Accordingly, when the gas engine E is again started, it is possible to prevent the air-fuel mixture from becoming too rich due to the direct supply of the liquefied fuel to the pressure regulator 13, and it is possible to secure a normal operation of the gas engine E.

In the case of running short of the fuel of the fuel cylinder 16, and connecting a new fuel cylinder 16 to the liquefied fuel passage 15, the manual rod 38 of the first shutoff valve 21 is pulled up, and the valve body 29 is broken away from the valve seat pipe 31 against the pressure force of the return spring 30 only for a predetermined time. Accordingly, since the first shutoff valve 21 can be set to the valve open state, it is possible to quickly fill the fuel in the liquefied fuel passage 15 so as to get ready for the start of the gas engine E.

Figure 3:
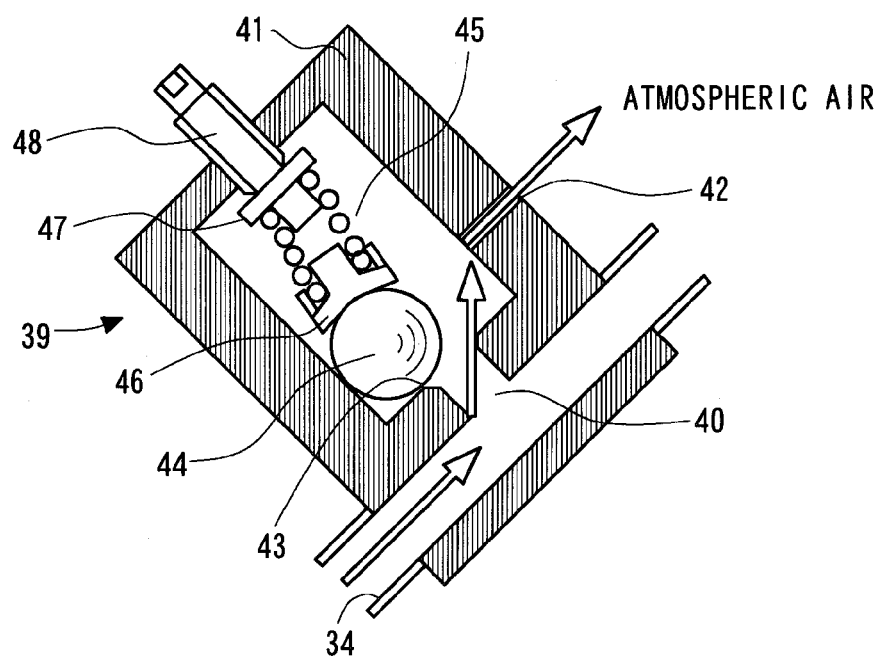
FIG. 3 is a cross sectional view of the tilting shutoff valve in a tilting state.

The tilting shutoff valve 39 shuts off the pressure passage 34 so as to stop the application of the negative pressure within the crank chamber 4 to the first shutoff valve 21, at a time when the gas engine E is tilted. FIG. 3 is a cross sectional view showing a state at a time when the tilting shutoff valve 39 is operated, that is, a position of the spherical valve body 44 at a time when the tilting shutoff valve 39 is operated. As shown in FIG. 3, if the tilting shutoff valve 39 is tilted and a degree of the tilt becomes large, the spherical valve body 44 breaks away from the valve seat 43. As a result, the internal space of the casing 41 is connected to the pressure passage 34, and the pressure passage 34 is connected to the atmospheric air through the depressurizing hole 42. In other words, the pressure of the pressure passage 34 comes to the atmospheric air.

Since the one-way valve 36 is set in such a manner as to transmit only the negative pressure to the negative pressure actuation chamber 26 side, the one-way valve 36 is kept being closed at the atmospheric pressure, and the diaphragm 28 of the first shutoff valve 21 is not biased to the negative pressure actuation chamber 26 side. Accordingly, since the valve body 29 is kept while closing the valve seat pipe 29, the liquefied fuel passage 15 supplying the liquefied fuel to the vaporizing chamber 14 from the fuel cylinder 16 via the first shutoff valve 21 is shut off.

As mentioned above, in accordance with the present embodiment, even in the case that does not always have the battery ready, and even in the case that comes short of being charged in the battery, it is possible to open the first shutoff valve 21 so as to start the gas engine E. Further, in the case that the gas engine E is tilted, it is possible to prevent the gas engine E from being started even by operating the recoil starter 2.

In the embodiment mentioned above, the liquefied fuel passage 15 is enlarged by using the second shutoff valve 22, in such a manner that the gas engine E can correspond to the high-load operating state. However, the present invention can be applied to the structure in which only the first shutoff valve 21 is arranged on the liquefied fuel passage 15 by excluding the second shutoff valve 22. In the structure in which only the first shutoff valve 21 is arranged, it is possible to inhibit the start at a time when the gas engine E is tilted at the predetermined angle or more, and in the case that the gas engine E is tilted at the predetermined angle or more even if the gas engine E is under rotating motion, it is possible to stop the gas engine E by rapidly stopping the fuel supply on the basis of the operation of the tilting shutoff valve 39.

The invention claimed is:

1. A gas fuel supply apparatus comprising:
a vaporizing chamber vaporizing a liquefied gas fuel supplied via a liquefied gas supply path;
a pressure regulator regulating a pressure of the vaporized gas fuel; and
the gas fuel supply apparatus supplying the pressure regulated gas fuel to a mixer provided in a four-cycle engine, wherein
the gas fuel supply apparatus comprises:
a shutoff valve shutting off said liquefied gas supply path during a stop of said engine, and canceling the shutoff in response only to a negative pressure of a pulsation pressure generated in a crank chamber of the engine by reciprocation of the engine during a rotation of the engine;
a pressure passage for transmitting the negative pressure within the engine to said shutoff valve; and
a tilting shutoff valve provided in said pressure passage.

2. A gas fuel supply apparatus according to claim 1, wherein
said tilting shutoff valve has a pressure releasing means communicating said pressure passage with an atmospheric air in response to a tilt equal to or more than a predetermined angle of the engine.

3. A gas fuel supply apparatus according to claim 2, wherein
said tilting shutoff valve is provided with a casing, a first opening communicating with said pressure passage and a second opening communicated with an atmospheric air are formed in said casing, and a spherical valve body energized to said first opening in a gravitational direction by a spring is provided within said casing so as to construct said pressure releasing means.

\* \* \* \* \*